(12) United States Patent
Kakishima et al.

(10) Patent No.: US 11,502,799 B2
(45) Date of Patent: Nov. 15, 2022

(54) TERMINAL, RADIO COMMUNICATION METHOD, AND BASE STATION

(71) Applicant: NTT DOCOMO, INC., Tokyo (JP)

(72) Inventors: Yuichi Kakishima, Palo Alto, CA (US); Ryosuke Osawa, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 30 days.

(21) Appl. No.: 16/975,975

(22) PCT Filed: Feb. 27, 2019

(86) PCT No.: PCT/JP2019/007632
§ 371 (c)(1),
(2) Date: Aug. 26, 2020

(87) PCT Pub. No.: WO2019/168049
PCT Pub. Date: Sep. 6, 2019

(65) Prior Publication Data
US 2021/0044396 A1    Feb. 11, 2021

(30) Foreign Application Priority Data

Feb. 27, 2018 (JP) .............................. JP2018-048579

(51) Int. Cl.
*H04W 4/00* (2018.01)
*H04L 5/00* (2006.01)
*H04W 72/04* (2009.01)

(52) U.S. Cl.
CPC ......... *H04L 5/005* (2013.01); *H04W 72/0446* (2013.01)

(58) Field of Classification Search
None
See application file for complete search history.

(56) References Cited

U.S. PATENT DOCUMENTS

| 2017/0105240 A1* | 4/2017 | Chen ..................... H04W 8/005 |
| 2018/0287757 A1* | 10/2018 | Onggosanusi ........ H04L 5/0053 |
| 2019/0165846 A1* | 5/2019 | Kim .................. H04W 72/0406 |

OTHER PUBLICATIONS

International Search Report issued in PCT/JP2019/007632 dated Apr. 9, 2019 (2 pages).
Written Opinion of the International Searching Authority issued in PCT/JP2019/007632 dated Apr. 9, 2019 (5 pages).
Huawei, HiSilicon; "Remaining issues on non-codebook based UL transmission"; 3GPP TSG RAN WG1 Meeting #92, R1-1803273; Athens, Greece; Feb. 26-Mar. 2, 2018 (6 pages).
Catt; "Remaining issues on non-codebook based UL transmission"; 3GPP TSG RAN WG1 Meeting #92bis, R1-1803739; Sanya, China; Apr. 16-20, 2018 (4 pages).

(Continued)

*Primary Examiner* — Zewdu A Beyen
(74) *Attorney, Agent, or Firm* — Osha Bergman Watanabe & Burton LLP

(57) ABSTRACT

A terminal is disclosed including a processor that identifies a resource for a Channel State Information-Reference Signal (CSI-RS); and a transmitter that transmits a Sounding Reference Signal (SRS) by using a precoder based on the resource that was last transmitted. In other aspects, a radio communication method and a base station are also disclosed.

4 Claims, 8 Drawing Sheets

(56) References Cited

OTHER PUBLICATIONS

Samsung; "Open issues on aperiodic CSI-RS for non-codebook based transmission"; 3GPP TSG RAN WG1 Meeting #92bis, R1-1804356; Sanya, China; Mar. 16-20, 2018 (3 pages).

Nokia, Nokia Shanghai Bell; "Remaining issues on UL non-codebook based transmission"; 3GPP TSG-RAN WG1 Meeting #92bis, R1-1805102; Sanya, China; Apr. 16-20, 2018 (4 pages).

3GPP TS 36.300 V8.12.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Extended European Search Report issued in counterpart European Patent Application No. 19761430.8, dated Oct. 12, 2021 (6 pages).

MediaTek Inc.; "Clarifications on Beam Management"; 3GPP TSG RAN WG1 Meeting AH1801, R1-1800159 Vancouver, CA; Jan. 22-26, 2018 (10 pages).

Office Action issued in Indian Application No. 202037041080; dated Jul. 13, 2022 (7 pages).

* cited by examiner

TERMINAL, RADIO COMMUNICATION METHOD, AND BASE STATION

TECHNICAL FIELD

The present disclosure relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for a larger volume and higher sophistication of LTE (LTE Rel. 8 and 9), LTE-Advanced (LTE-A or LTE Rel. 10, 11, 12 and 13) has been specified.

LTE successor systems (also referred to as, for example, Future Radio Access (FRA), the 5th generation mobile communication system (5G), 5G+(plus), New Radio (NR), New radio access (NX), Future generation radio access (FX) or LTE Rel. 14, 15 or subsequent releases) have been also studied.

According to legacy LTE (e.g., LTE Rel. 13), a user terminal (UE: User Equipment) transmits a Sounding Reference Signal (SRS) to measure a channel on uplink.

Furthermore, a base station (e.g., eNodeB (eNB)) transmits a downlink control channel (UL grant) for instructing scheduling of UL data (uplink shared channel (PUSCH: Physical Uplink Shared Channel)), and the UE transmits the UL data according to the UL grant.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It has been studied that, in a future radio communication system (e.g., NR), a UE decides a precoder for PUSCH transmission based on at least an SRS Resource Index (SRI). The precoder based on the SRI may be referred to as an SRS precoder.

It has been studied that the UE determines the SRS precoder based on a CSI-RS. However, study regarding specifically which CSI-RS is used to determine the SRS precoder, i.e., a UE operation related to the CSI-RS for determining the SRS precoder has not developed yet. There is a risk that, if the operation is not appropriately determined, a system throughput lowers.

It is therefore one of objects of the present disclosure to provide a user terminal and a radio communication method that can appropriately determine an SRS precoder.

Solution to Problem

A user terminal according to one aspect of the present disclosure includes: a control section that identifies a resource for a Channel State Information-Reference Signal (CSI-RS); and a transmitting section that transmits a Sounding Reference Signal (SRS) by using a precoder based on the latest transmitted resource.

Advantageous Effects of Invention

According to the present disclosure, it is possible to appropriately determine an SRS precoder.

DESCRIPTION OF EMBODIMENTS

It has been studied for NR that a UE supports codebook based transmission and non-codebook based transmission. It has been studied that, for each transmission, the UE decides a precoder for PUSCH transmission by using at least an SRS Resource Index (SRI).

For example, in a case of codebook based transmission, the UE may determine the precoder for PUSCH transmission based on an SRI, a Transmitted Rank Indicator (TRI), and a Transmitted Precoding Matrix Indicator (TPMI). In a case of non-codebook based transmission, the UE may determine the precoder for PUSCH transmission based on the SRI.

Precoding to be applied to codebook based transmission may be referred to as codebook based precoding. Precoding to be applied to non-codebook based transmission may be referred to as non-codebook based precoding.

Figure 1:
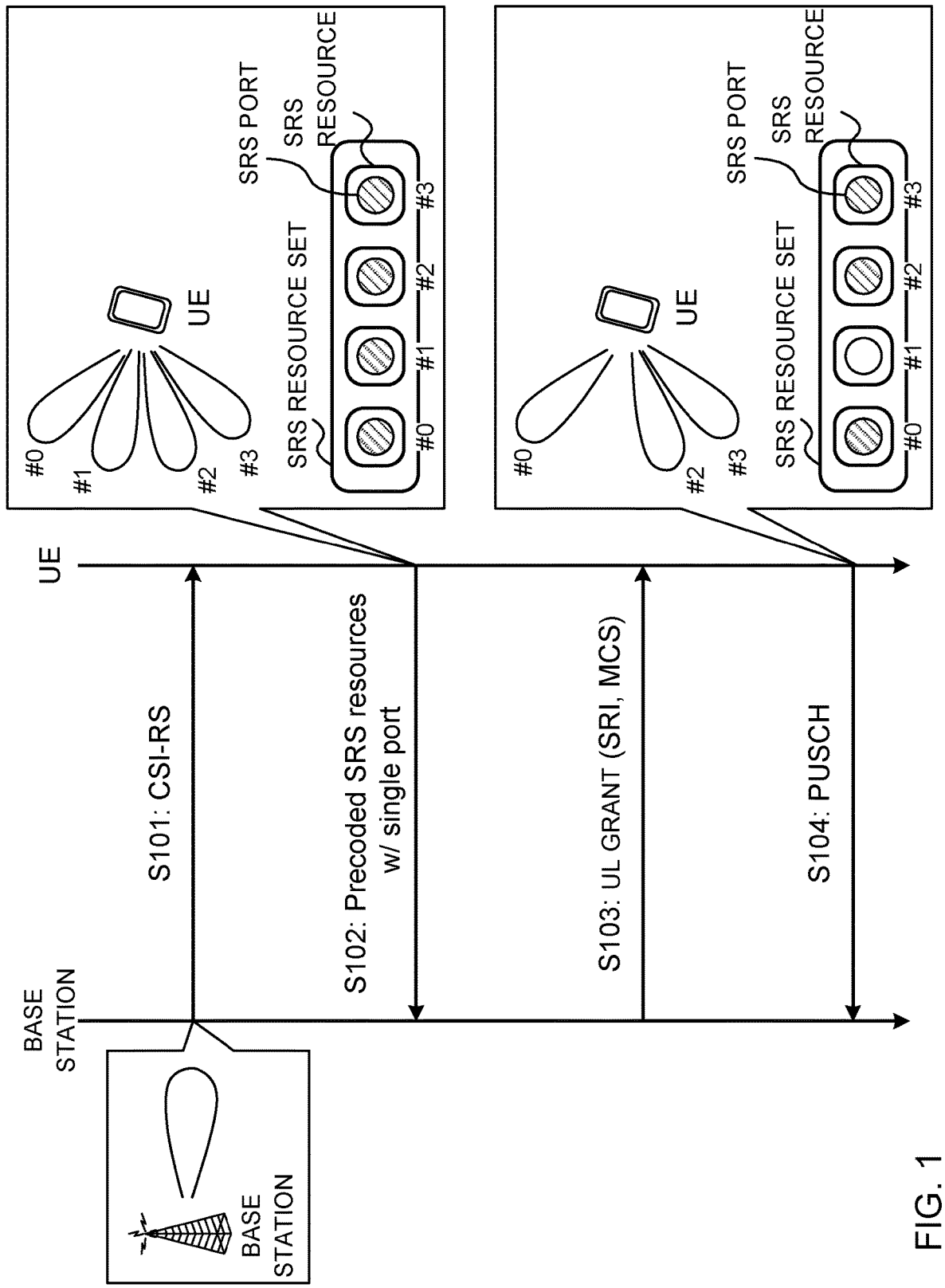
FIG. 1 is a diagram illustrating one example of a non-codebook based transmission sequence.

FIG. 1 is a diagram illustrating one example of a non-codebook based transmission sequence.

In step S101, a base station (that may be referred to a gNB or a Transmitting/receiving Point (TRP)) transmits a Reference Signal (RS), and a UE performs measurement using the reference signal.

The RS may be a channel state measurement RS (CSI-RS: Channel State Information RS), a Primary Synchronization Signal (PSS: Primary SS), a Secondary Synchronization Signal (SSS: Secondary SS), a Mobility Reference Signal (MRS: Mobility RS), a Tracking Reference Signal (TRS: Tracking RS), a signal included in a Synchronization Signal Block (SSB), a DeModulation Reference Signal (DMRS) and a beam-specific signal, or a signal that is configured by extending and/or changing these signals (e.g., a signal that is configured by changing a density and/or a periodicity).

The RS in step S101 will be described as a CSI-RS below, yet is not limited to this. In this description, the CSI-RS may be read as one of the above RSs.

In step S102, the UE may transmit the SRS by using precoded SRS resources w/ a single port.

The UE may determine a precoder (SRS precoder) to be applied to the SRS by a reciprocity based method. For example, the UE may determine the SRS precoder based on a relevant CSI-RS (e.g., the CSI-RS resource measured in step S101, a position of the CSI-RS resource and a measurement result that uses this resource).

In addition, one or a plurality of SRS resources may be configured to the UE. An SRS resource set related to a given number of SRS resources may be configured to the UE. The number of SRS resources or SRS resource sets configured to the UE may be limited by a maximum transmission rank (the number of layers). Each SRS resource may have one or a plurality of SRS ports (may be associated with one or a plurality of SRS ports).

An example in FIG. 1 assumes that an SRS resource set including four SRS resources (SRS resources #0 to #3 associated with SRI=0 to 3) is configured to the UE. Furthermore, each SRS resource is assumed to have one SRS port. In addition, the number of SRS resources and the number of ports are not limited to 4.

The SRS resource may be specified based on at least one of pieces of information such as an SRS resource position (e.g., time and/or frequency resource positions, a resource offset, a resource periodicity, the number of SRS symbols, an SRS bandwidth, Comb and a sequence ID), a signal sequence, the number of SRS ports, an SRS port number, and an SRS resource number (that may be referred to as an SRS resource configuration ID (SRS-ResourceConfigId)).

Information related to the SRS resource set and/or the SRS resource may be configured to the UE by using higher layer signaling, physical layer signaling or a combination of these. In this regard, higher layer signaling may be, for example, one of Radio Resource Control (RRC) signaling, Medium Access Control (MAC) signaling and broadcast information, or a combination of these.

MAC signaling may be, for example, a MAC Control Element (MAC CE) or a MAC Protocol Data Unit (PDU). Broadcast information may be, for example, a Master Information Block (MIB), a System Information Block (SIB), Remaining Minimum System Information (RMSI), and Other System Information (OSI).

Physical layer signaling may be, for example, Downlink Control Information (DCI).

Information related to an association between the SRS precoder and the relevant CSI-RS is configured to the UE by using higher layering signaling.

In step S102, the UE may transmit each of the precoded SRS resources #0 to #3.

The base station may perform measurement (e.g., channel measurement) by using the precoded SRS resources in step S102.

In step S103, the base station transmits a UL grant for scheduling UL data transmission to the UE. In step S104, the UE transmits a signal (e.g., PUSCH) to which a given precoder (e.g., at least one of SRS precoders) has been applied based on the UL grant in step S103.

The UL grant in step S103 preferably includes information (e.g., SRI) for identifying a precoder used for UL data transmission. The UL grant may include information related to a parameter (e.g., a Modulation and Coding Scheme (MCS)) to be applied to UL data transmission. Furthermore, the UL grant may include or may not include the TRI and/or the TPMI applied to UL data transmission.

The gNB may narrow precoders used by the UE for PUSCH transmission by, for example, a notification of an SRI. For example, the UE may identify one or a plurality of SRS resources from the configured SRS resources based on one or a plurality of SRIs included in the UL grant received in step S103. In this case, the UE may transmit a PUSCH of the number of layers corresponding to the specified number of SRS resources by using the precoder associated with the specified SRS resources in step S104.

In the example in FIG. 1, the UL grant in step S103 indicates SRI=0, 2 and 3, and the UE performs three layer transmission by using the precoders associated with SRI=0, 2 and 3 in step S104.

In addition, the UE may determine the precoder based on the SRI other than the SRI indicated by the UL grant, and performs transmission.

In addition, when the received UL grant includes the TPMI, the UE may determine the precoder that is preferable for an SRS port in the selected SRS resource based on the TPMI. When the received UL grant includes the TRI, the UE may determine the number of ports used for transmission from the SRS port in the selected SRS resource based on the TRI.

It has been studied as described above that the UE determines the SRS precoder based on the CSI-RS. However, study regarding specifically which CSI-RS is used to determine the SRS precoder, i.e., a UE operation related to the CSI-RS for determining the SRS precoder has not developed yet. There is a risk that, if the operation is not appropriately determined, a system throughput lowers.

Hence, the inventors have conceived a method for appropriately determining an SRS precoder in the UE.

An embodiment according to the present disclosure will be described in detail below with reference to the drawings. A radio communication method according to each embodiment may be applied alone or may be applied in combination.

In addition, the "SRS precoder" in this description may be read as a precoder (e.g., PUSCH precoder) for another channel and/or signal.

(Radio Communication Method)

According to one embodiment, the UE identifies a reference resource for determining an SRS precoder, and determines the SRS precoder based on the reference resource.

The reference resource may be at least one of following (1) and (2). (1) A latest transmitted CSI-RS resource, and (2) (A resource corresponding to) A timing defined by $n-n_{ref}$.

Regarding above (2), n may be a given reference timing. For example, the reference timing may be a timing at which a CSI-RS is triggered, a timing at which the CSI-RS is transmitted or a timing at which an SRS is transmitted. In addition, the reference timing may be used to determine above (1). For example, the reference resource may be a latest transmitted CSI-RS resource prior to the SRS transmission timing.

Regarding above (2), $n_{ref}$ may be a smallest value greater than or equal to a threshold Y such that $n-n_{ref}$ corresponds to a valid downlink slot. Information regarding the threshold Y may be notified to the UE by using higher layer signaling (e.g., RRC signaling), physical layer signaling (e.g., DCI) or a combination of these.

For example, the information regarding the threshold Y may be included in the UL grant in step S103 in FIG. 1, and the UE may use the reference resource of $n-n_{ref}$ to determine the SRS precoder in step S104.

In addition, units of n and $n_{ref}$ may be, for example, a slot, a mini slot, a symbol and a subframe.

Figure 2:
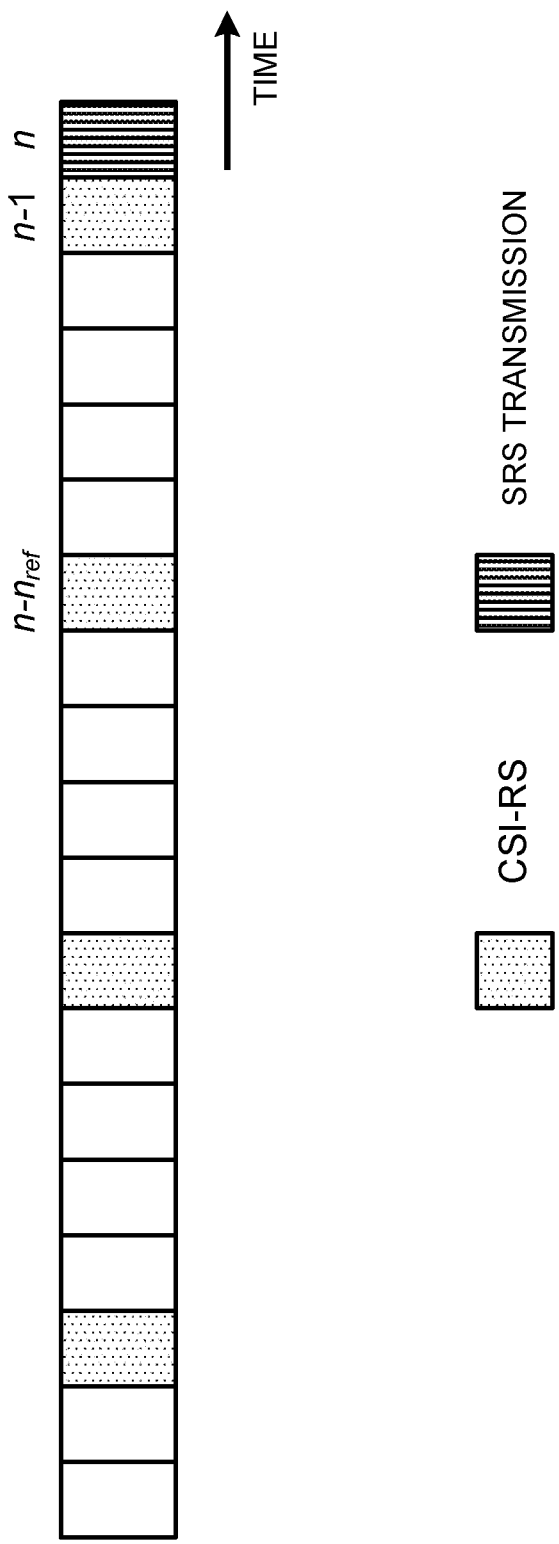
FIG. 2 is a diagram illustrating one example of a reference resource according to one embodiment.

FIG. 2 is a diagram illustrating one example of a reference resource according to one embodiment. This example assumes that a slot #n that is an SRS transmission timing is a reference. For example, the reference resource in above (1) corresponds to a CSI-RS resource of a slot #n−1. When, for example, it is assumed that Y=8 has been configured, the reference resource in above (2) may correspond to a CSI-RS resource of a slot #n−$n_{ref}$ ($n_{ref}$=6).

The UE may determine the SRS precoder by using a plurality of CSI-RS samples before and/or after the reference resource in addition to the reference resource or instead of the reference resource. For example, the UE may determine the SRS precoder based on an average of a plurality of CSI-RSs to which identical precoding (or a port, a beam or a resource) is applied.

The UE may notify the base station of UE capability related to a timing gap value (e.g., $n_{ref}$). The timing gap may relate to processing capability of the UE. The gNB may determine the above threshold Y based on the UE capability.

The UE may trigger measurement of the CSI-RS by a notification (referred to simply as a trigger below) from the gNB. The UE may identify the CSI-RS position (resource) based on the trigger. For example, the trigger may be DCI, and may include timing offset information from reception of the DCI. In addition, a unit of the timing offset (referred to as X below) may be, for example, a slot, a mini slot, a symbol and a subframe.

When, for example, detecting (receiving) the trigger in a slot N, the UE may assume that the CSI-RS is transmitted in N+X. The UE does not need to assume that the CSI-RS is transmitted at a timing before the trigger (before reception of the trigger). In other words, the UE may assume that the CSI-RS is transmitted after receiving the trigger.

The UE may measure the CSI-RS to avoid a tracking error.

According to the above-described embodiment, the UE can identify the reference resource, and appropriately determine the SRS precoder based on the reference resource.

(Radio Communication System)

The configuration of the radio communication system according to one embodiment of the present disclosure will be described below. This radio communication system uses one or a combination of the radio communication method according to each of the above embodiment of the present disclosure to perform communication.

Figure 3:
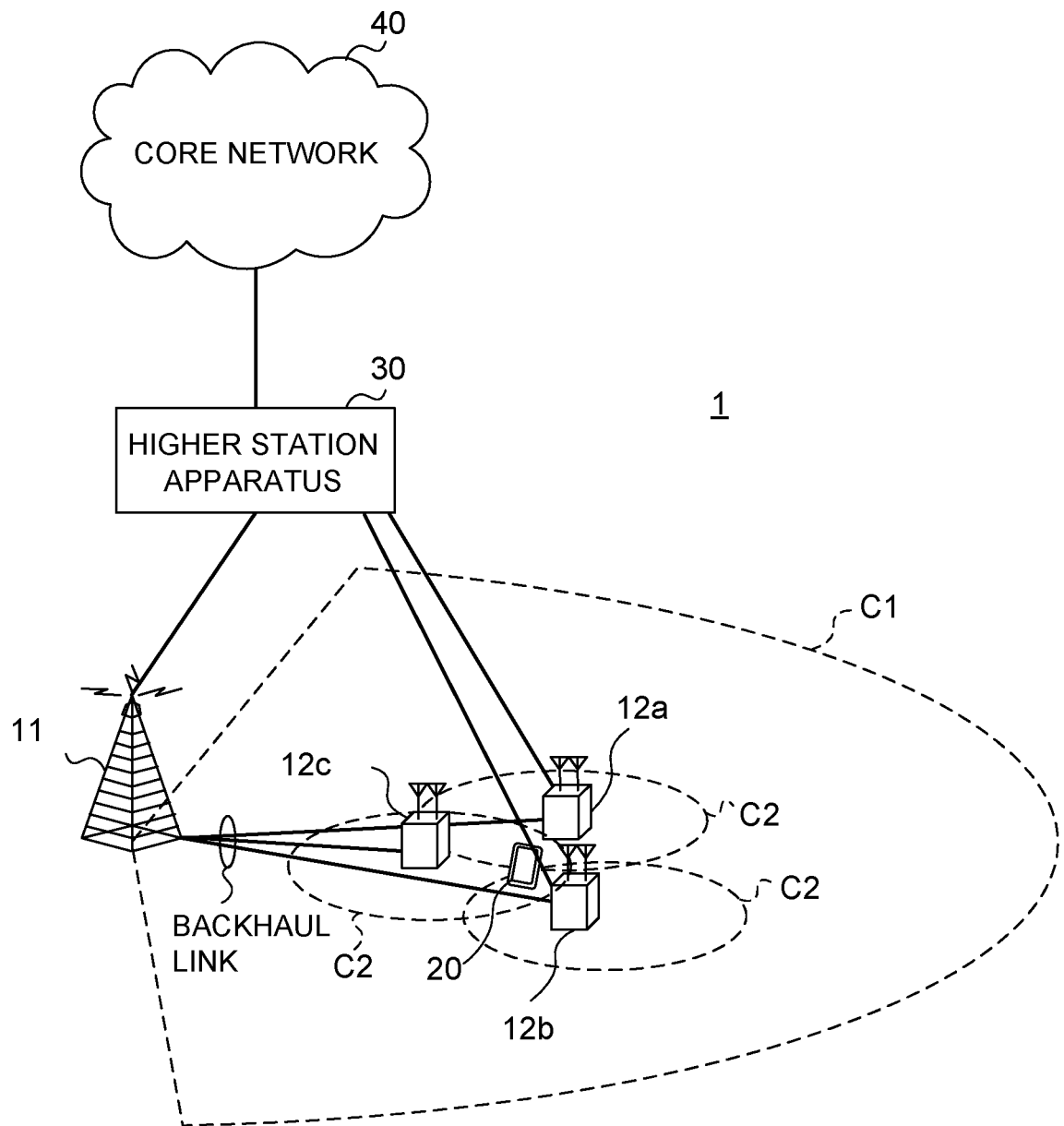
FIG. 3 is a diagram illustrating one example of a schematic configuration of a radio communication system according to one embodiment.

FIG. 3 is a diagram illustrating one example of a schematic configuration of the radio communication system according to the one embodiment. A radio communication system 1 can apply Carrier Aggregation (CA) and/or Dual Connectivity (DC) that aggregate a plurality of base frequency blocks (component carriers) whose one unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and user terminals 20 are not limited to the aspect illustrated in FIG. 3.

The user terminal 20 can connect with both of the radio base station 11 and the radio base stations 12. The user terminal 20 is assumed to concurrently use the macro cell C1 and the small cells C2 by using CA or DC. Furthermore, the user terminal 20 can apply CA or DC by using a plurality of cells (CCs).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

Furthermore, the user terminal 20 can perform communication by using Time Division Duplex (TDD) and/or Frequency Division Duplex (FDD) in each cell. Furthermore, each cell (carrier) may be applied a single numerology or may be applied a plurality of different numerologies.

The numerology may be a communication parameter that is applied to transmission and/or reception of a given signal and/or channel, and may be at least one of, for example, a subcarrier spacing, a bandwidth, a symbol length, a cyclic prefix length, a subframe length, a TTI length, the number of symbols per TTI, a radio frame configuration, filtering processing and windowing processing.

The radio base station 11 and each radio base station 12 (or the two radio base stations 12) can be configured to be connected by way of wired connection (e.g., optical fibers compliant with a Common Public Radio Interface (CPRI) or an X2 interface) or by way of radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmitting/receiving point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmitting/receiving point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and Single Carrier Frequency Division Multiple Access (SC-FDMA) and/or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or contiguous resource blocks per terminal and causes a plurality of terminals to use respectively different bands to reduce an inter-terminal interference. In this regard, uplink and downlink radio access schemes are not limited to a combination of these, and other radio access schemes may be used for the uplink and downlink radio access schemes.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and System Information Blocks (SIBs) are transmitted on the PDSCH. Furthermore, Master Information Blocks (MIBs) are transmitted on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCH is transmitted on the PDCCH.

In addition, the scheduling information may be notified by the DCI. For example, DCI for scheduling DL data reception may be referred to as a DL assignment, and DCI for scheduling UL data transmission may be referred to as a UL grant.

The number of OFDM symbols used for the PDCCH is transmitted on the PCFICH. Transmission acknowledgement information (also referred to as, for example, retransmission control information, HARQ-ACK or ACK/NACK) of a Hybrid Automatic Repeat reQuest (HARD) for the PUSCH is transmitted on the PHICH. The EPDCCH is subjected to frequency division multiplexing with the PDSCH (downlink shared data channel) and is used to transmit DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are transmitted on the PUSCH. Furthermore, downlink radio quality information (CQI: Channel Quality Indicator), transmission acknowledgement information and a Scheduling Request (SR) are transmitted on the PUCCH. A random access preamble for establishing connection with a cell is transmitted on the PRACH.

The radio communication system 1 transmits a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 transmits a Sounding Reference Signal (SRS) and a DeModulation Reference Signal (DMRS) as uplink reference signals. In this regard, the DMRS may be referred to as a user terminal specific reference signal (UE-specific Reference Signal). Furthermore, a reference signal to be transmitted is not limited to these.

(Radio Base Station)

Figure 4:
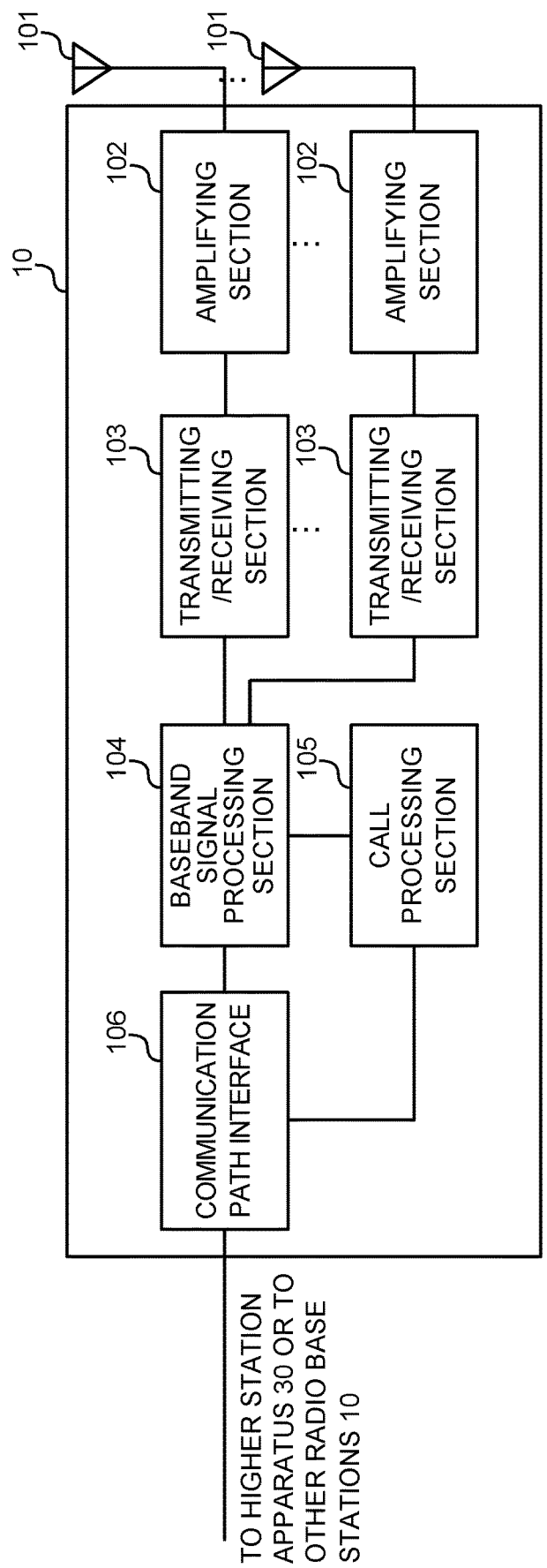
FIG. 4 is a diagram illustrating one example of an overall configuration of a radio base station according to the one embodiment.

FIG. 4 is a diagram illustrating one example of an overall configuration of the radio base station according to the one embodiment. The radio base station 10 includes pluralities of transmitting/receiving antennas 101, amplifying sections 102 and transmitting/receiving sections 103, a baseband signal processing section 104, a call processing section 105 and a communication path interface 106. In this regard, the radio base station 10 only needs to be configured to include one or more of each of the transmitting/receiving antennas 101, the amplifying sections 102 and the transmitting/receiving sections 103.

User data transmitted from the radio base station 10 to the user terminal 20 on downlink is input from the higher station apparatus 30 to the baseband signal processing section 104 via the communication path interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmitting/receiving section 103. Furthermore, the baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency band, and transmits a radio frequency signal. The radio frequency signal subjected to frequency conversion by each transmitting/receiving section 103 is amplified by each amplifying section 102, and is transmitted from each transmitting/receiving antenna 101. The transmitting/receiving sections 103 can be composed of transmitters/receivers, transmitting/receiving circuits or transmitting/receiving apparatuses described based on a common knowledge in a technical field according to the present disclosure. In this regard, the transmitting/receiving sections 103 may be composed as an integrated transmitting/receiving section or may be composed of transmitting sections and receiving sections.

Meanwhile, each amplifying section 102 amplifies a radio frequency signal received by each transmitting/receiving antenna 101 as an uplink signal. Each transmitting/receiving section 103 receives the uplink signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on user data included in the input uplink signal, and transfers the user data to the higher station apparatus 30 via the communication path interface 106. The call processing section 105 performs call processing (such as a configuration and release) of a communication channel, state management of the radio base station 10, and radio resource management.

The communication path interface 106 transmits and receives signals to and from the higher station apparatus 30 via a given interface. Furthermore, the communication path interface 106 may transmit and receive (backhaul signaling) signals to and from the another radio base station 10 via an inter-base station interface (e.g., optical fibers compliant with the Common Public Radio Interface (CPRI) or the X2 interface).

Each transmitting/receiving section 103 may receive a Sounding Reference Signal (SRS) and an uplink shared channel (PUSCH) transmitted by applying a precoder.

Figure 5:
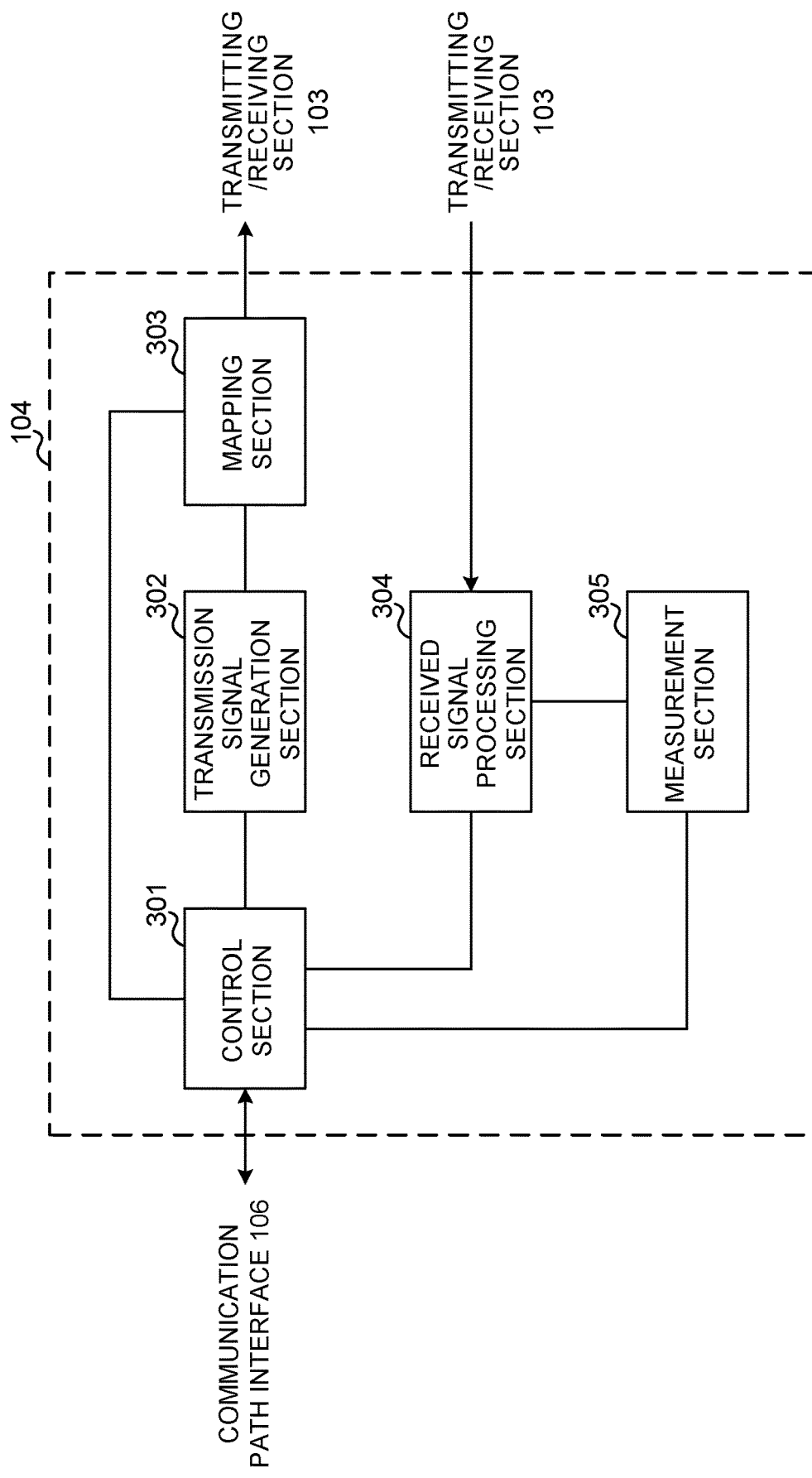
FIG. 5 is a diagram illustrating one example of a function configuration of the radio base station according to the one embodiment.

FIG. 5 is a diagram illustrating one example of a function configuration of the radio base station according to the one embodiment. In addition, this example mainly illustrates function blocks of characteristic portions according to the present embodiment, and may assume that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present disclosure.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal transmitted on the PDSCH), and a downlink control signal (e.g., a signal that is transmitted on the PDCCH and/or the EPDCCH and is, for example, transmission acknowledgement information). Furthermore, the control section 301 controls generation of the downlink control signal and the downlink data signal based on a result obtained by deciding whether or not it is necessary to perform retransmission control on an uplink data signal. Furthermore, the control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

Furthermore, the control section 301 controls scheduling of an uplink data signal (e.g., a signal transmitted on the PUSCH), an uplink control signal (e.g., a signal that is transmitted on the PUCCH and/or the PUSCH and is, for example, transmission acknowledgement information), a random access preamble (e.g., a signal transmitted on the PRACH) and an uplink reference signal.

The control section 301 may perform control for transmitting information for identifying a reference resource used by the user terminal 20 to determine an SRS precoder.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present disclosure.

The transmission signal generating section 302 generates, for example, a DL assignment for notifying downlink data allocation information, and/or a UL grant for notifying uplink data allocation information based on the instruction from the control section 301. The DL assignment and the UL grant are both DCI, and conform to a DCI format. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on a given radio resource based on the instruction from the control section 301, and outputs the downlink signal to each transmitting/receiving section 103. The mapping section 303 can be composed of a mapper, a mapping circuit or a mapping apparatus described based on the common knowledge in the technical field according to the present disclosure.

The received signal processing section 304 performs reception processing (e.g., demapping, demodulation and decoding) on a received signal input from each transmitting/receiving section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present disclosure.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present disclosure.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 305 may output a measurement result to the control section 301.

(User Terminal)

Figure 6:
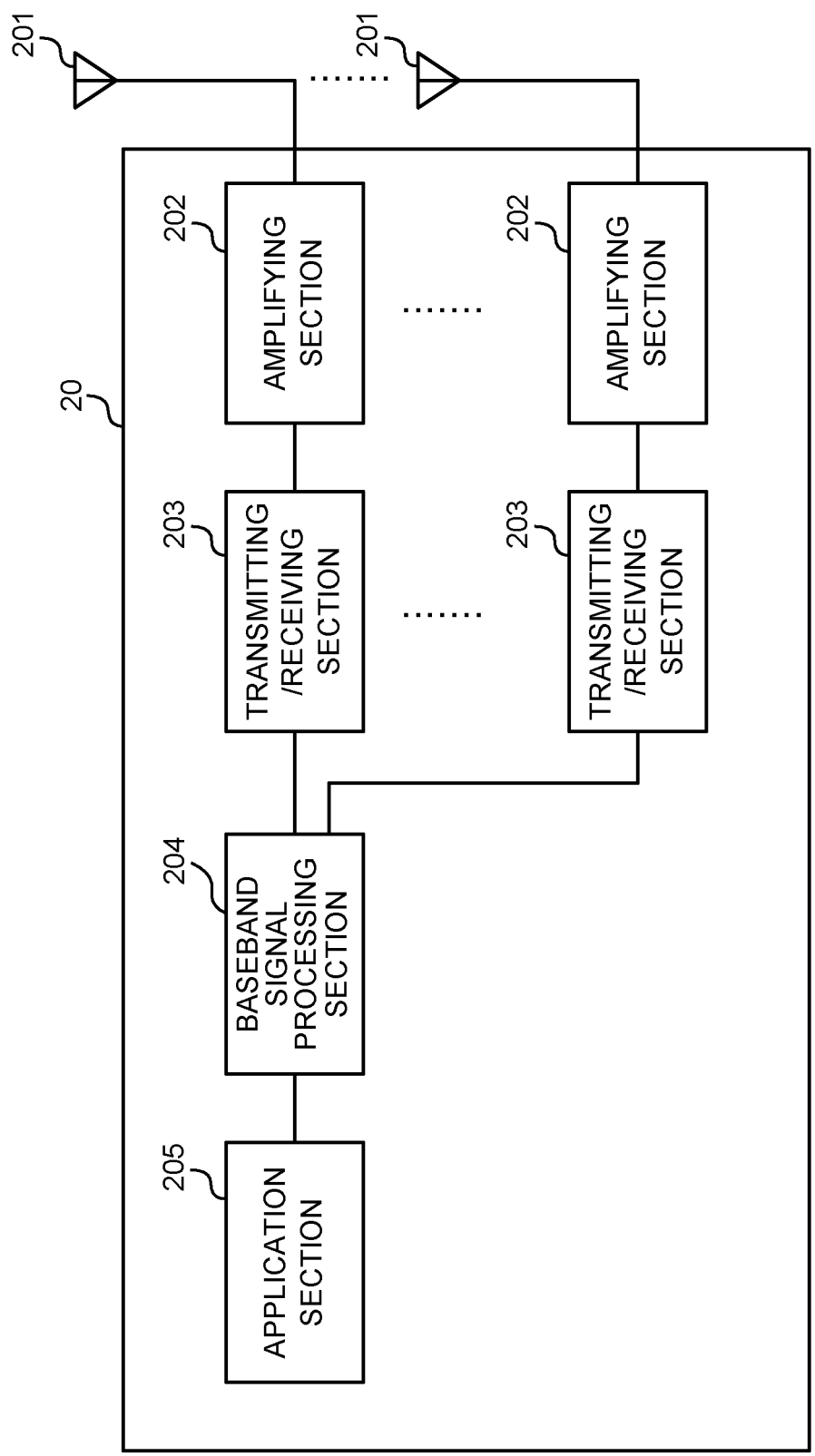
FIG. 6 is a diagram illustrating one example of an overall configuration of a user terminal according to the one embodiment.

FIG. 6 is a diagram illustrating one example of an overall configuration of the user terminal according to the one embodiment. The user terminal 20 includes pluralities of transmitting/receiving antennas 201, amplifying sections 202 and transmitting/receiving sections 203, a baseband signal processing section 204 and an application section 205. In this regard, the user terminal 20 only needs to be configured to include one or more of each of the transmitting/receiving antennas 201, the amplifying sections 202 and the transmitting/receiving sections 203.

Each amplifying section 202 amplifies a radio frequency signal received at each transmitting/receiving antenna 201. Each transmitting/receiving section 203 receives a downlink signal amplified by each amplifying section 202. Each transmitting/receiving section 203 performs frequency conversion on the received signal into a baseband signal, and outputs the baseband signal to the baseband signal processing section 204. The transmitting/receiving sections 203 can be composed of transmitters/receivers, transmitting/receiving circuits or transmitting/receiving apparatuses described based on the common knowledge in the technical field according to the present disclosure. In this regard, the transmitting/receiving sections 203 may be composed as an integrated transmitting/receiving section or may be composed of transmitting sections and receiving sections.

The baseband signal processing section 204 performs FFT processing, error correcting decoding, and reception processing of retransmission control on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs transmission processing of retransmission control (e.g., HARQ transmission processing), channel coding, precoding, Discrete Fourier Transform (DFT) processing and IFFT processing on the uplink user data, and transfers the uplink user data to each transmitting/receiving section 203.

Each transmitting/receiving section 203 converts the baseband signal output from the baseband signal processing section 204 into a radio frequency band, and transmits a radio frequency signal. The radio frequency signal subjected to the frequency conversion by each transmitting/receiving section 203 is amplified by each amplifying section 202, and is transmitted from each transmitting/receiving antenna 201.

Each transmitting/receiving section 203 may transmit a Sounding Reference Signal (SRS) and an uplink shared channel (PUSCH) by applying the precoder.

Figure 7:
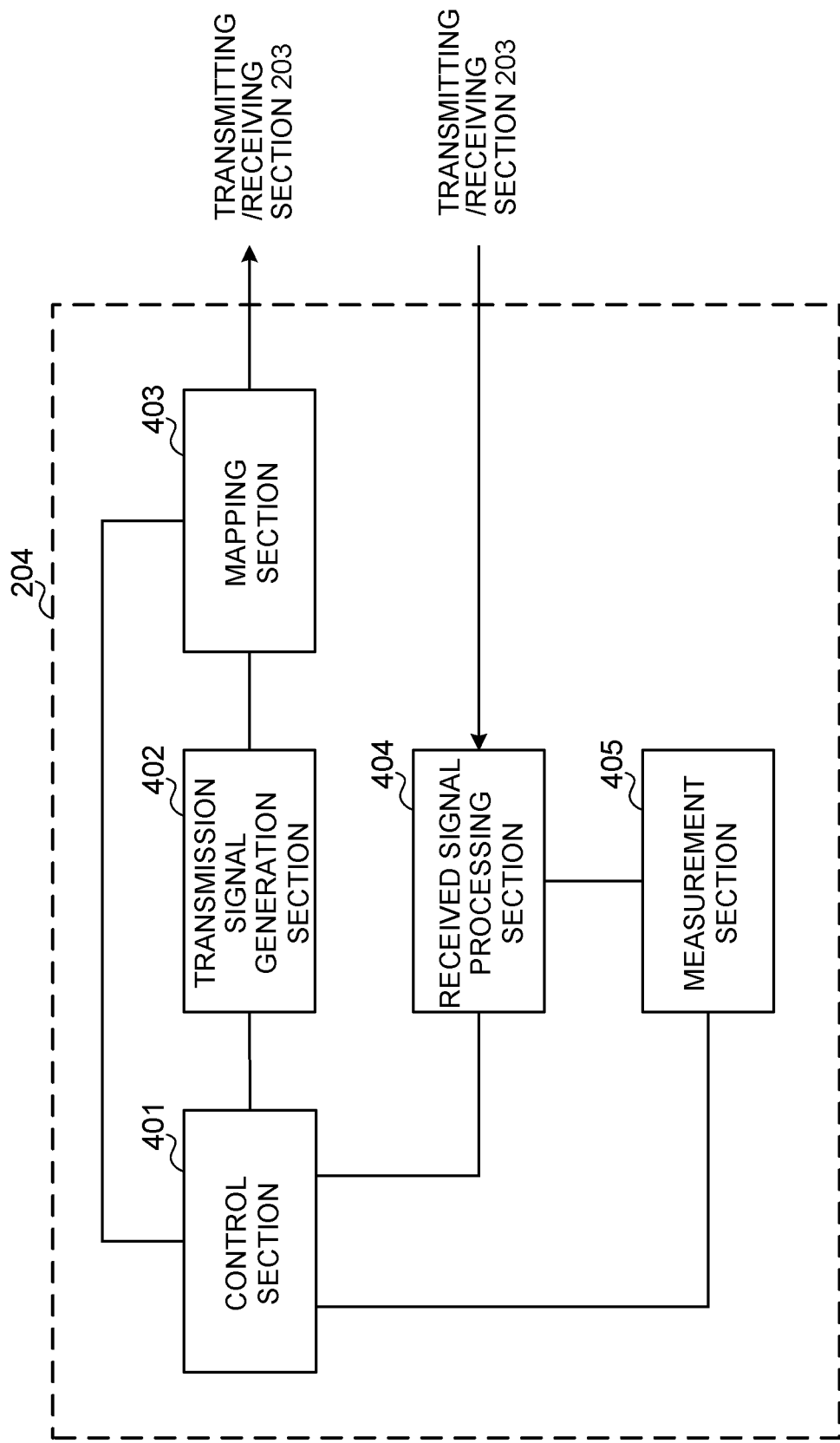
FIG. 7 is a diagram illustrating one example of a function configuration of the user terminal according to the one embodiment.

FIG. 7 is a diagram illustrating one example of a function configuration of the user terminal according to the one embodiment. In addition, this example mainly illustrates function blocks of characteristic portions according to the present embodiment, and may assume that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present disclosure.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains, from the received signal processing section 404, a downlink control signal and a downlink data signal transmitted from the radio base station 10. The control section 401 controls generation of an uplink control signal and/or an uplink data signal based on a result obtained by deciding whether or not it is necessary to perform retransmission control on the downlink control signal and/or the downlink data signal.

The control section 401 may identify a reference resource (e.g., CSI-RS reference resource) used to determine an SRS precoder. For example, the reference resource may be the latest transmitted CSI-RS resource. The reference resource may be the CSI-RS resource included in a timing of $n-n_{ref}$. In this regard, n is a given reference timing, and $n_{ref}$ may be a smallest value greater than or equal to a threshold Y (Y may be an optional number) that is determined such that the timing of $n-n_{ref}$ corresponds to a valid downlink slot.

Furthermore, when obtaining from the received signal processing section 404 various pieces of information notified from the radio base station 10, the control section 401 may update parameters used for control based on the various pieces of information.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present disclosure.

For example, the transmission signal generating section 402 generates an uplink control signal related to transmission acknowledgement information and Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on a radio resource based on the instruction from the control section 401, and outputs the uplink signal to each transmitting/receiving section 203. The mapping section 403 can be composed of a mapper, a mapping circuit or a mapping apparatus described based on the common knowledge in the technical field according to the present disclosure.

The received signal processing section 404 performs reception processing (e.g., demapping, demodulation and decoding) on the received signal input from each transmitting/receiving section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present disclosure. Furthermore, the received signal processing section 404 can compose the reception section according to the present disclosure.

The received signal processing section 404 outputs information decoded by the reception processing to the control section 401. The received signal processing section 404 outputs, for example, broadcast information, system information, RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present disclosure.

For example, the measurement section 405 may perform RRM measurement or CSI measurement based on the received signal. The measurement section 405 may measure received power (e.g., RSRP), received quality (e.g., RSRQ, an SINR and an SNR), a signal strength (e.g., RSSI) or channel information (e.g., CSI). The measurement section 405 may output a measurement result to the control section 401.

(Hardware Configuration)

In addition, the block diagrams used to describe the above embodiment illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 8:
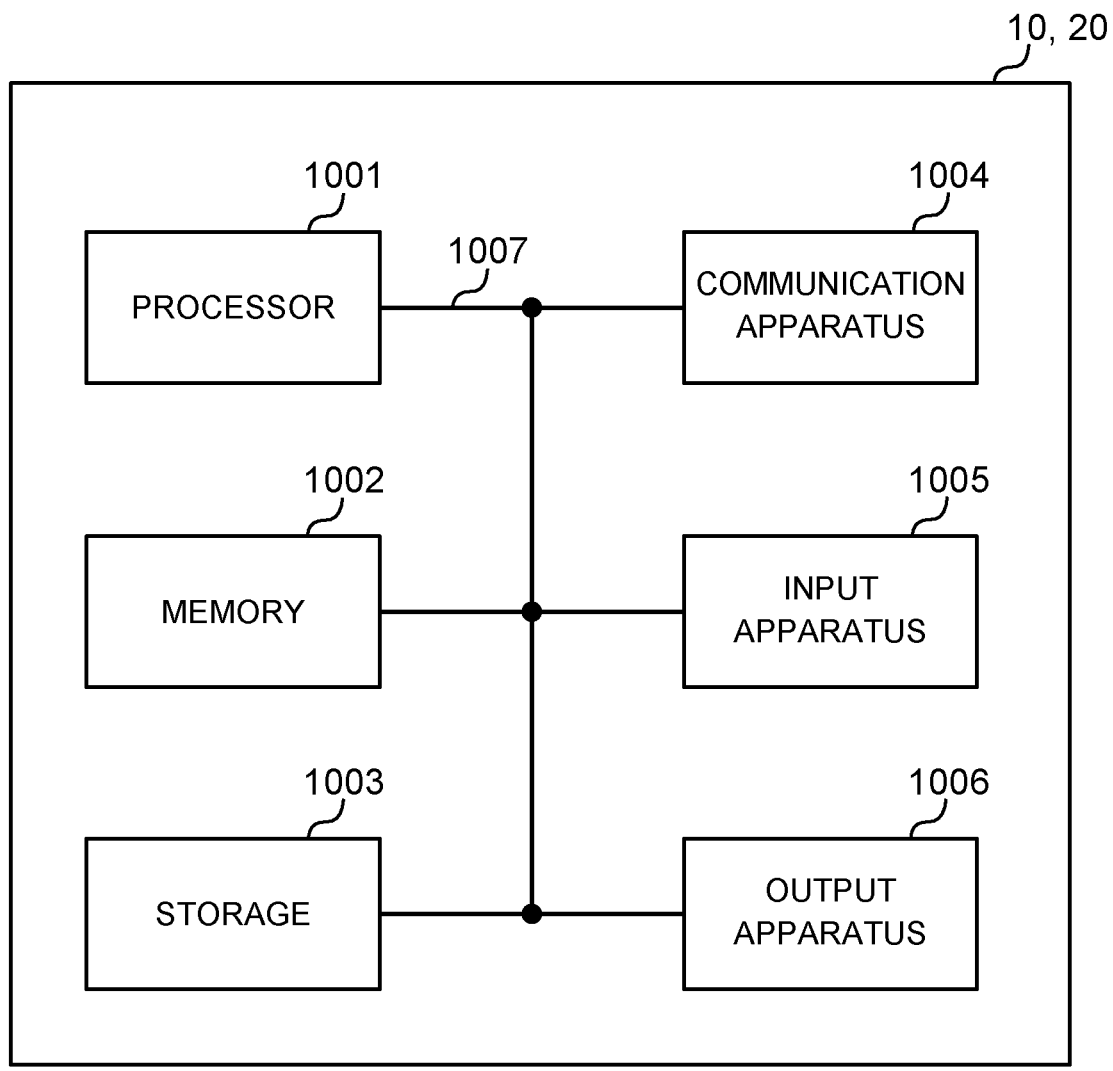
FIG. 8 is a diagram illustrating one example of hardware configurations of the radio base station and the user terminal according to the one embodiment.

For example, the radio base station and the user terminal according to the one embodiment of the present disclosure may function as computers that perform processing of the radio communication method according to the present disclosure. FIG. 8 is a diagram illustrating one example of the hardware configurations of the radio base station and the user terminal according to the one embodiment. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 8 or may be configured without including part of the apparatuses.

For example, FIG. 8 illustrates the only one processor 1001. However, there may be a plurality of processors. Furthermore, processing may be executed by one processor or may be executed by one or more processors concurrently, successively or by another method. In addition, the processor 1001 may be implemented by one or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiment are used. For example, the control section 401 of the user terminal 20 may be realized by a control program stored in the memory 1002 and operating on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmitting/receiving device) that performs communication between computers via a wired and/or radio network, and is also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above transmitting/receiving antennas 101 (201), amplifying sections 102 (202), transmitting/receiving sections 103 (203) and communication path interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using buses that are different between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

Modified Example

In addition, each term that has been described in this description and/or each term that is necessary to understand this description may be replaced with terms having identical or similar meanings. For example, a channel and/or a symbol may be signals (signaling). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time domain. Each of one or a plurality of durations (frames) that composes a radio frame may be referred to as a subframe. Furthermore, the subframe may include one or a plurality of slots in the time domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerologies. Furthermore, the slot may include a plurality of mini slots. Each mini slot may include one or a plurality of symbols in the time domain. Furthermore, the mini slot may be referred to as a sub slot.

The radio frame, the subframe, the slot, the mini slot and the symbol each indicate a time unit for transmitting signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time interval (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

Resource Blocks (RBs) are resource allocation units of the time domain and the frequency domain, and may include one or a plurality of contiguous subcarriers in the frequency domain. Furthermore, the RB may include one or a plurality of symbols in the time domain or may have the length of 1 slot, 1 mini slot, 1 subframe or 1 TTI. 1 TTI or 1 subframe may be each composed of one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may be composed of one or a plurality of Resource Elements (REs). For example, 1 RE may be a radio resource domain of 1 subcarrier and 1 symbol.

In this regard, structures of the above radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are in no respect restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive ones.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The input and output information and signals can be overwritten, updated or additionally written. The output information and signals may be deleted. The input information and signals may be transmitted to other apparatuses.

Notification of information is not limited to the aspect/embodiment described in this description and may be performed by other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIBs) and System Information Blocks (SIBs)), and Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be made implicitly (by, for example, not notifying this given information or by notifying another information). Decision may be made based on a value (0 or 1) expressed by 1 bit, may be made based on a boolean expressed by true or false or may be made by comparing numerical values (e.g., comparison with a given value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station is also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used.

The mobile station is also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present disclosure may be applied to a configuration where communication between the radio base station and the user terminal is replaced with communication between a plurality of user terminals (D2D: Device-to-Device). In this case, the user terminal 20 may be configured to include the functions of the above radio base station 10. Furthermore, words such as "uplink" and "downlink" may be read as "sides". For example, the uplink channel may be read as a side channel.

Similarly, the user terminal in this description may be read as the radio base station. In this case, the radio base station 10 may be configured to include the functions of the above user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between two or more elements, and can include that one or more intermediate elements exist between the two elements "connected" or "coupled" with each other. The elements may be coupled or connected physically, logically or by way of a combination of physical and logical connections. For example, "connection" may be read as "access".

It can be understood that, when connected in this description, the two elements are "connected" or "coupled" with each other by using one or more electric wires, cables and/or printed electrical connection, and by using electromagnetic energy having wavelengths in radio frequency domains, microwave domains and/or (both of visible and invisible) light domains in some non-restrictive and incomprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an exclusive OR.

(Supplementary Note)

Supplementary matters according to the present disclosure will be supplementarily described below.

<Reference Resource for Non-Codebook Based Transmission>

<<Background>>

Rel. 15 NR supports non-codebook based precoding.

A Sounding Reference Signal (SRS) precoder is determined based on an associated Channel State Information (CSI)-Reference Signal (RS) resource.

However, which CSI-RS needs to be used to derive the SRS precoder is not indicated.

<<Proposal>>

A reference resource is a latest transmitted CSI-RS.

The reference resource is defined by the timing $n-n_{ref}$.

In this regard, $n_{ref}$ is such a minimum value equal to or more than Y that $n_{ref}$ corresponds to a valid downlink slot.

Y may be configured or may be dynamically switched.

The UE may use (e.g., average) a plurality of CSI-RS samples prior to the reference resource.

The UE may notify UE capability related to a timing gap value (e.g., $n_{ref}$).

A gNB instruction (e.g., Downlink Control Information (DCI) triggering) may indicate a CSI-RS position.

For example, the CSI-RS may be transmitted with a timing offset of X (for DCI triggering).

The UE may not assume that the CSI-RS is transmitted before the DCI triggering.

The UE may perform CSI-RS measurement to avoid a tracking error.

Remarks: n may be a CSI-RS triggering timing, a CSI-RS transmission timing or an SRS transmission timing.

Remarks: n may be a slot or symbol unit.

In view of the above, the following configurations are proposed.

[Configuration 1]

A user terminal includes:

a transmitting section that transmits a Sounding Reference Signal (SRS) by applying a precoder; and a control section that identifies a reference source (e.g., a reference resource for channel state measurement) used to determine the precoder.

[Configuration 2]

According to the user terminal according to the configuration 1, the control section assumes that the reference resource is a latest transmitted CSI-RS resource.

[Configuration 3]

According to the user terminal according to the configuration 1, the control section assumes that the reference resource is a CSI-RS resource included in a timing of $n-n_{ref}$, where n is a given reference timing, and $n_{ref}$ is a minimum value that is determined such that the timing of $n-n_{ref}$ corresponds to a valid downlink slot, and is equal to or more than a threshold Y.

[Configuration 4]

A radio communication method of a user terminal includes:

transmitting a Sounding Reference Signal (SRS) by applying a precoder; and identifying a reference resource for channel state measurement used to determine the precoder.

The invention according to the present disclosure has been described in detail above. However, it is obvious for a person skilled in the art that the invention according to the present disclosure is not limited to the embodiment described in this description. The invention according to the present disclosure can be carried out as modified and changed aspects without departing from the gist and the scope of the invention defined based on the recitation of the claims. Accordingly, the disclosure of this description intends for exemplary explanation, and does not bring any restrictive meaning to the invention according to the present disclosure.

This application is based on Japanese Patent Application No. 2018-048579 filed on Feb. 27, 2018, the entire contents of which are incorporated by reference herein.

The invention claimed is:

1. A terminal comprising:
a processor that identifies a resource for a Channel State Information-Reference Signal (CSI-RS); and
a transmitter that transmits a Sounding Reference Signal (SRS) by using a precoder based on the resource that was last transmitted,
wherein the resource is defined by a slot according to a formula "$n-n_{ref}$,"
wherein:
"n" is a reference timing, and
"$n_{ref}$" is a minimum value greater than or equal to a threshold, such that the slot "$n-n_{ref}$" corresponds to a valid downlink slot, and
wherein information regarding the threshold is notified to the terminal by higher layer signaling.

2. A radio communication method of a terminal comprising:
identifying a resource for a Channel State Information-Reference Signal (CSI-RS); and
transmitting a Sounding Reference Signal (SRS) by using a precoder based on the resource that was last transmitted,
wherein the resource is defined by a slot according to a formula "$n-n_{ref}$,"
wherein:
"n" is a reference timing, and
"$n_{ref}$" is a minimum value greater than or equal to a threshold, such that the slot "$n-n_{ref}$" corresponds to a valid downlink slot, and
wherein information regarding the threshold is notified to the terminal by higher layer signaling.

3. A base station comprising:
a transmitter that transmits a Channel State Information-Reference Signal (CSI-RS) to a terminal; and
a receiver that receives a Sounding Reference Signal (SRS) transmitted from the terminal by using a precoder based on a resource of the CSI-RS that was last transmitted,
wherein the resource is defined by a slot according to a formula "$n-n_{ref}$,"
wherein:
"n" is a reference timing, and
"$n_{ref}$" is a minimum value greater than or equal to a threshold, such that the slot "$n-n_{ref}$" corresponds to a valid downlink slot, and
wherein the transmitter notifies information regarding the threshold to the terminal by higher layer signaling.

4. A system comprising:
a terminal comprising:
a processor that identifies a resource for a Channel State Information-Reference Signal (CSI-RS); and
a transmitter of the terminal that transmits a Sounding Reference Signal (SRS) by using a precoder based on the resource that was last transmitted,
wherein the resource is defined by a slot according to a formula "$n-n_{ref}$,"
wherein:
"n" is a reference timing, and
"$n_{ref}$" is a minimum value greater than or equal to a threshold, such that the slot
"$n-n_{ref}$" corresponds to a valid downlink slot, and
wherein information regarding the threshold is notified to the terminal by higher layer signaling; and
a base station comprising:
a transmitter of the base station that transmits the CSI-RS to the terminal; and
a receiver that receives the SRS transmitted from the terminal by using the precoder based on the resource of the CSI-RS that was last transmitted.

* * * * *